United States Patent
Holkkola

(10) Patent No.: US 9,319,342 B2
(45) Date of Patent: Apr. 19, 2016

(54) METHOD AND APPARATUS FOR IP COMMISSIONING AND DECOMMISSIONING IN ORCHESTRATED COMPUTING ENVIRONMENTS

(71) Applicants: NIXU SOFTWARE OY, Espoo (FI); Juha Holkkola, Helsinki (FI)

(72) Inventor: Juha Holkkola, Helsinki (FI)

(73) Assignee: FUSIONLAYER OY, Espoo (FI)

( * ) Notice: Subject to any disclaimer, the term of this patent is extended or adjusted under 35 U.S.C. 154(b) by 213 days.

(21) Appl. No.: 13/921,361

(22) Filed: Jun. 19, 2013

(65) Prior Publication Data

US 2013/0346618 A1  Dec. 26, 2013

(30) Foreign Application Priority Data

Jun. 20, 2012 (FI) ...................................... 20125680

(51) Int. Cl.
*G06F 15/173* (2006.01)
*H04L 12/911* (2013.01)
*H04L 12/24* (2006.01)
*H04L 29/12* (2006.01)
*H04L 12/46* (2006.01)

(52) U.S. Cl.
CPC ............ *H04L 47/70* (2013.01); *H04L 41/0273* (2013.01); *H04L 61/2007* (2013.01); *H04L 12/4641* (2013.01)

(58) Field of Classification Search
None
See application file for complete search history.

(56) References Cited

U.S. PATENT DOCUMENTS

| 7,802,000 | B1 | 9/2010 | Huang et al. |
| 9,124,633 | B1 * | 9/2015 | Eizadi ..................... H04L 61/20 |
| 2010/0205304 | A1 * | 8/2010 | Chaturvedi et al. ........... 709/226 |
| 2011/0090911 | A1 * | 4/2011 | Hao et al. ................. 370/395.53 |
| 2013/0326599 | A1 * | 12/2013 | Bray et al. ........................ 726/6 |

FOREIGN PATENT DOCUMENTS

| KR | 101001413 A | 4/2005 |
| KR | 100914036 A | 6/2009 |

OTHER PUBLICATIONS

Search Report for Finnish Patent Application No. 20125680; Feb. 28, 2013.

* cited by examiner

*Primary Examiner* — Wing F Chan
*Assistant Examiner* — Padma Mundur
(74) *Attorney, Agent, or Firm* — Barnes & Thornburg LLP

(57) ABSTRACT

A server computer (IPCDS) for commissioning/decommissioning IP resources to server instances (SI) provisioned using an orchestration solution. The server and client computers constitute a client-server architecture. The server computer has a processing system and memory for applications and data, including program code instructing the processing system to implement the following features: a user interface (UI) for remote management, providing access to data (DB) managed by the server computer; a web-based application programming interface (API) supporting service oriented architecture ["SOA"]; a logic to assign and release IP resources to the clients (CL) based on calls via the API. The logic creates unique IP resource(s) for the server instances (SI), which are nodes of networks with overlapping address spaces. The unique IP resources are based on a name of the private network of the respective server instance, and an IP address within that private network.

4 Claims, 4 Drawing Sheets

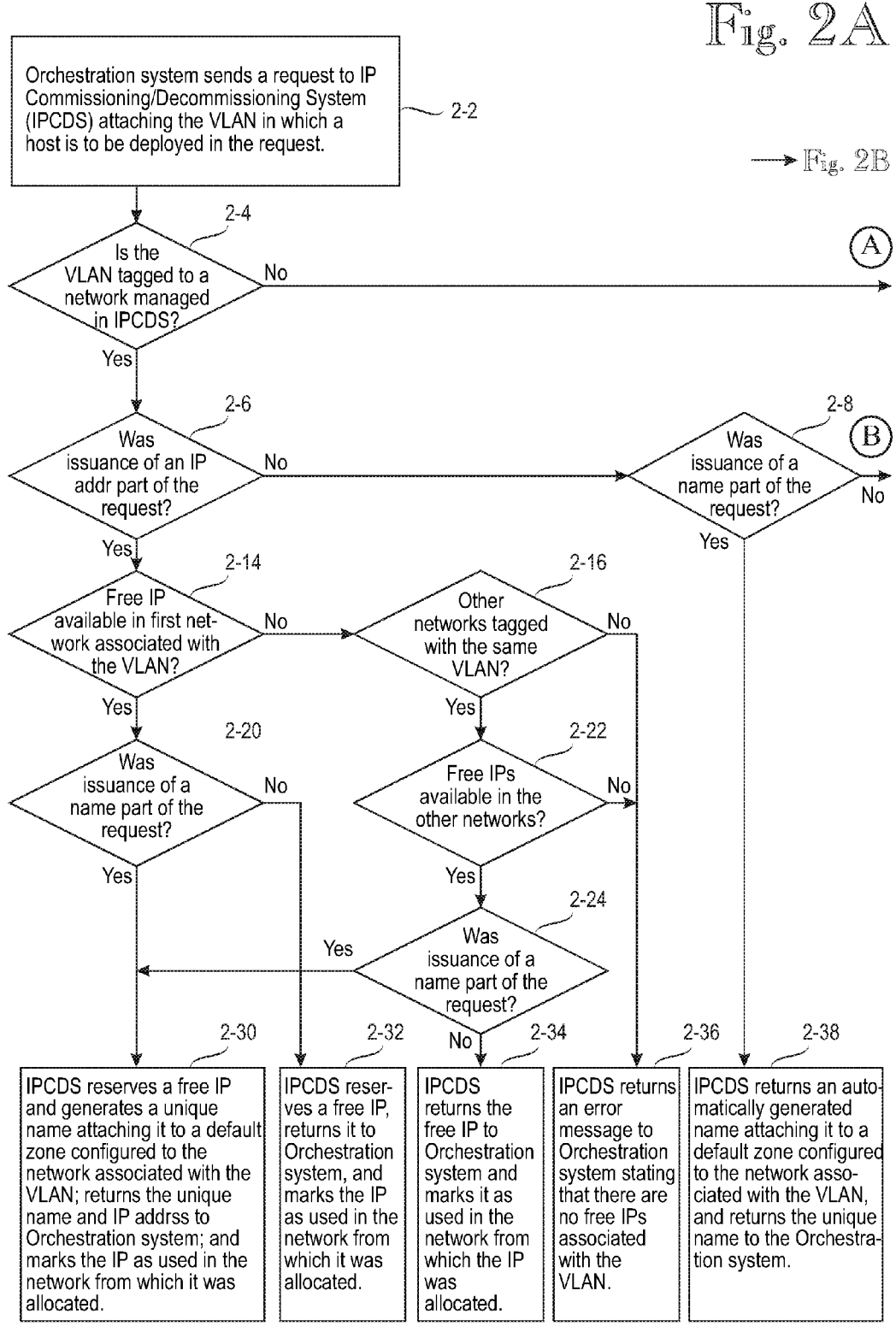

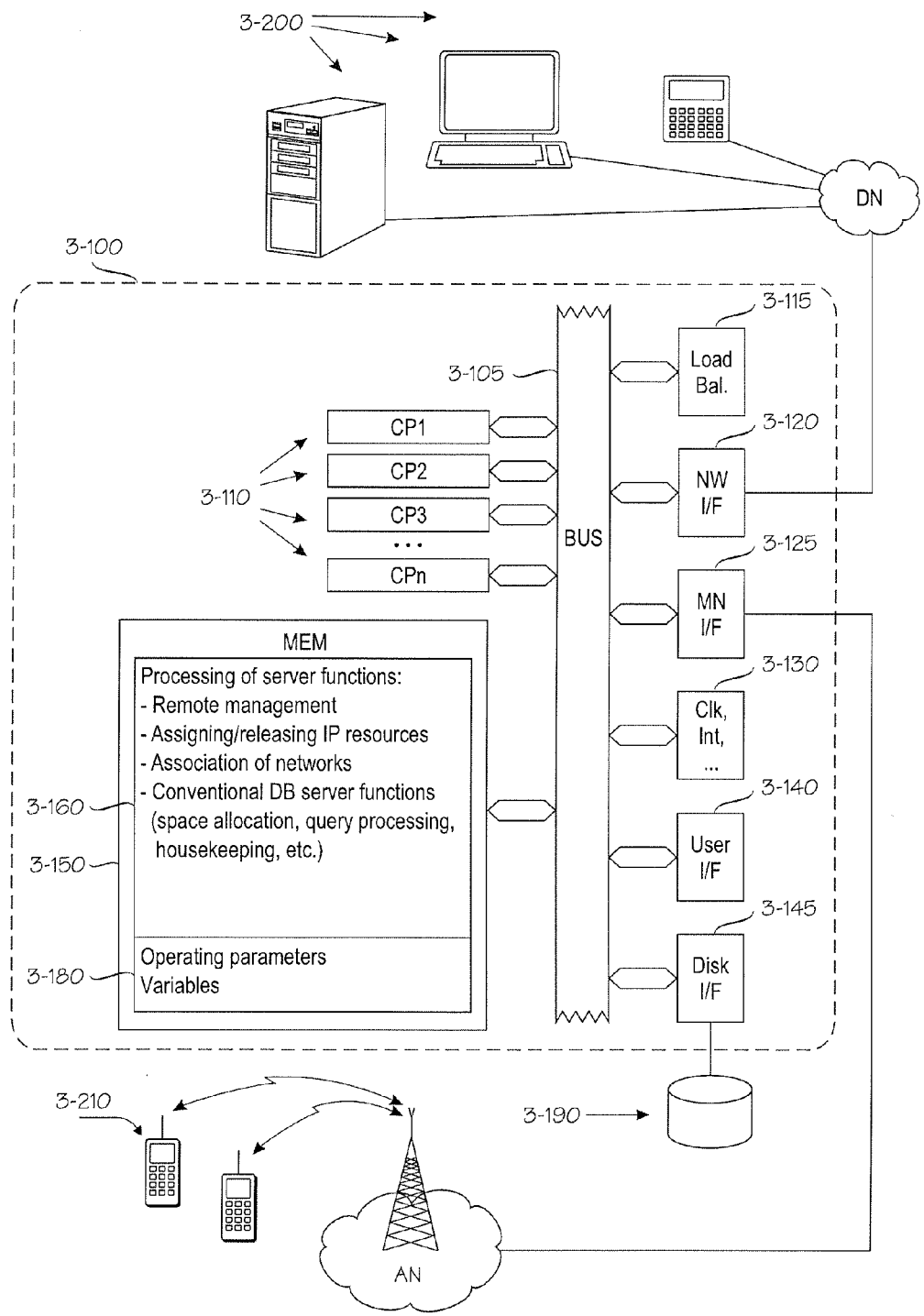

METHOD AND APPARATUS FOR IP COMMISSIONING AND DECOMMISSIONING IN ORCHESTRATED COMPUTING ENVIRONMENTS

PRIORITY CLAIM

The present application claims priority from Finnish patent application no 20125680, filed 20 Jun. 2012, the disclosure of which is incorporated herein by reference in its entirety.

FIELD

Disclosed embodiments relate to commissioning and decommissioning of IP resources in cloud computing environments.

BACKGROUND

As has been known for a long time, Internet Protocol v. 4 (IPv4) is rather limited in terms of available address space. To address the issue, standard RFC1918 defines three networks intended for private use, namely 10.0.0.0 (Class A), 172.16.0.0 (Class B) and 192.168.0.0 (Class C). None of these private networks have been routed to the public internet. Large corporations and service providers typically have Class A network (10.0.0.0) address space to expand the address space available to them, while ADSL and cable modems commonly used in homes and small offices distribute IP addresses from private 192.168 networks. Connections to the outside world are provided by utilizing Network Address Translation (NAT) technology, wherein a NAT device located between the public and private networks acts as a bridge. Since several private networks share the same 10.0.0.0 address space, they are overlapping. Overlap has been an insignificant problem as long as these private networks have been run internally, instead of routing them to the public internet.

Overlapping of private networks becomes a problem in connection with cloud computing, or cloud-based services. For instance IaaS (Infrastructure as a Service) service providers are increasingly deploying multi-tenant computing environments used to offer services concurrently to several business clients, all of whom may use the same 10.0.0.0 address space especially in the context of Virtual Private Cloud and/or other similar technologies. In use-cases such as this, the private networks used by different tenants typically overlap.

In the following description, "orchestration" is used in its established meaning within Service Oriented Architecture ("SOA") realm, when discussing automated workflows between data processing and communication systems. Enterprises and service providers use orchestration solutions to align business requests with the applications, data and infrastructure. The solutions are typically used to define the policies and service levels through automated workflows, provisioning, and change management. With this technology, organizations are able to create an application-aligned infrastructure that can be scaled up, down or sideways based on the needs of each application. Orchestration also provides centralized management of the resource pool, including billing, metering, and chargeback for consumption.

Allocation of IP addresses, names and other network parameters to the various servers, commonly referred to as workloads, which execute applications in orchestrated environments, has traditionally been accomplished by configuring an IP address in the servers and by adding the server's name with the corresponding IP address to a domain name server (DNS) manually, or by having such allocation performed dynamically using Dynamic Host Configuration Protocol (DHCP) and dynamic DNS. Since the IP addresses and the names of the physical servers run in traditional orchestrated computing environments have been relatively static, their SOA-based automated workflow management processes have not been extended to integrate with IP and name commissioning mechanisms. As existing orchestration solutions are expanded to cloud-based computing environments, the traditional methods used to manage IP addresses and names described above will create various problems. For instance, as cloud-based computing paradigm requires that new virtual machines are provisioned on demand, the manual IP and name assignment process associated with the prior art methods used for allocation IP resources and names in traditional orchestrated computing environments quickly become a bottleneck as far as the scalability of the entire cloud-based computing environment is concerned. In addition, although the cloud-based on-demand computing paradigm requires that the life-cycle of a virtual server instance can be anywhere from minutes to several years, DHCP servers provide a predefined and fixed lease time for the automatically assigned IP addresses, thereby making it impossible to align the IP lease times with the dynamic nature of the virtual computing environment. Furthermore, the prior art techniques make it impossible to automatically reclaim an IP address when a virtual machine is decommissioned, as even with DHCP, the decommissioning is tied to the pre-defined lease time of the IP addresses that have been issued. The prior art methods thus make it impossible to align the lease time of an IP address with the unique life-cycle of each virtual machine run within the cloud.

Limitations of DHCP are quickly revealed by attempting to use in connection with cloud computing. One of the reasons for the poor compatibility between DHCP and cloud computing is that DHCP was never designed for cloud computing or web-based integration models. For instance, DHCP operates on OSI Layer 2 (L2). In practice, a client sends a broadcast message to a local-area network (LAN). A DHCP server in that LAN captures the broadcast message, inspects the client's Medium Access Control (MAC) address, which is a unique address of the network interface adapter, and returns an IP address with other network parameters to the MAC address. After that the client configures the network parameters for itself and is able to adopt a TCP/IP connection, which operates on higher OSI layers.

In practice, the above-described methodology requires that the client and the DHCP server must be interconnected by an L2 connection. In practice, the client and the DHCP server must be connected to the same LAN network. The LAN may be comprised of multiple VLAN networks, but these must be interconnected on L2 layer. In cases where clients have overlapping 10.0.0.0 address spaces, the service provider must isolate them from one another by configuring the overlapping address spaces into distinct LAN networks. As a result, all private networks are isolated from one another, which enables IP traffic within the network on one hand and prevents clients from accessing the networks of other clients.

A consequence of the facts that, firstly, DHCP operates on L2 and, secondly, overlapping address spaces must be isolated into separate LANs, is that a single DHCP cannot logically reside in multiple LANs separately. In other words, in the case of multiple private networks, each of them must have a dedicated DHCP server.

Internet Protocol version 6 (IPv6) provides two mechanisms for dynamic IP allocations. These mechanisms are called Stateful autoconfiguration and Stateless autoconfiguration. Neither autoconfiguration mechanism solves the above-identified problems because, firstly, stateful autoconfiguration (DHCPv6) is not really any different from DHCPv4 used in IPv4 environments. This is because each time an IP resource is allocated to a virtual machine, the allocated IP resource obtains a fixed lease value, which basically means that the IP resource shall remain allocated for a predefined period of time, regardless of whether or not the allocated IP resource actually continues to be utilized by the virtual machine. Within cloud-based environments, this is undesirable, because the IP addresses should be commissioned (issued) whenever a new virtual machine goes live, and decommissioned (released) whenever that virtual machine is removed from the virtualized computing environment.

On the other hand, stateless autoconfiguration means that a client autonomously obtains an IP address on the basis of router advertisements. As far as SOA architectures and orchestration are concerned, there are two reasons why this scheme may not work. First, in environments where orchestration is used, it is a typical requirement that the IP address is obtained from a network that matches the Virtual Local Area Network (VLAN) in which a virtual machine is intended to run. In other words, the IP address has to be allocated from a specific network corresponding to the VLAN in which the virtual machine is to be deployed, instead of giving the virtual machine an arbitrary IP address that happens to be available (the latter is what stateless autoconfiguration leads to). The second reason why stateless autoconfiguration may not work in this use case is that the environments are typically multi-tenant environments where the administrator has to be able to actively monitor allocation levels of each network and determine what equipments and clients are being run in the networks. In the event that the IP addresses are obtained autonomously by the clients, there is no way to control the IP addresses which a given virtual machine will have obtained, nor will there be any transparency to this process that would allow the administrator to manage these relationships and/or track the allocation of IP allocations.

SUMMARY

Disclosed embodiments provide methods, equipment and computer program products to alleviate one or more of the problems identified above. This is achieved by embodiments disclosed in the attached independent claims. More specifically, disclosed embodiments provide a method, equipment and computer program products which can be used to commission and decommission IP resources, such as IP addresses and names in a way that alleviates at least one of the two problems described above. The dependent claims and the following detailed description and drawings relate to embodiments which solve additional problems and/or provide additional benefits.

BRIEF DESCRIPTION OF THE DRAWINGS

In the following, the invention will be described in greater detail by means of disclosed embodiments with reference to the attached drawings, in which

FIG. 3 schematically shows an exemplary block diagram for the various server and/or client computers.

DETAILED DESCRIPTION OF DISCLOSED EMBODIMENTS

Figure 1:
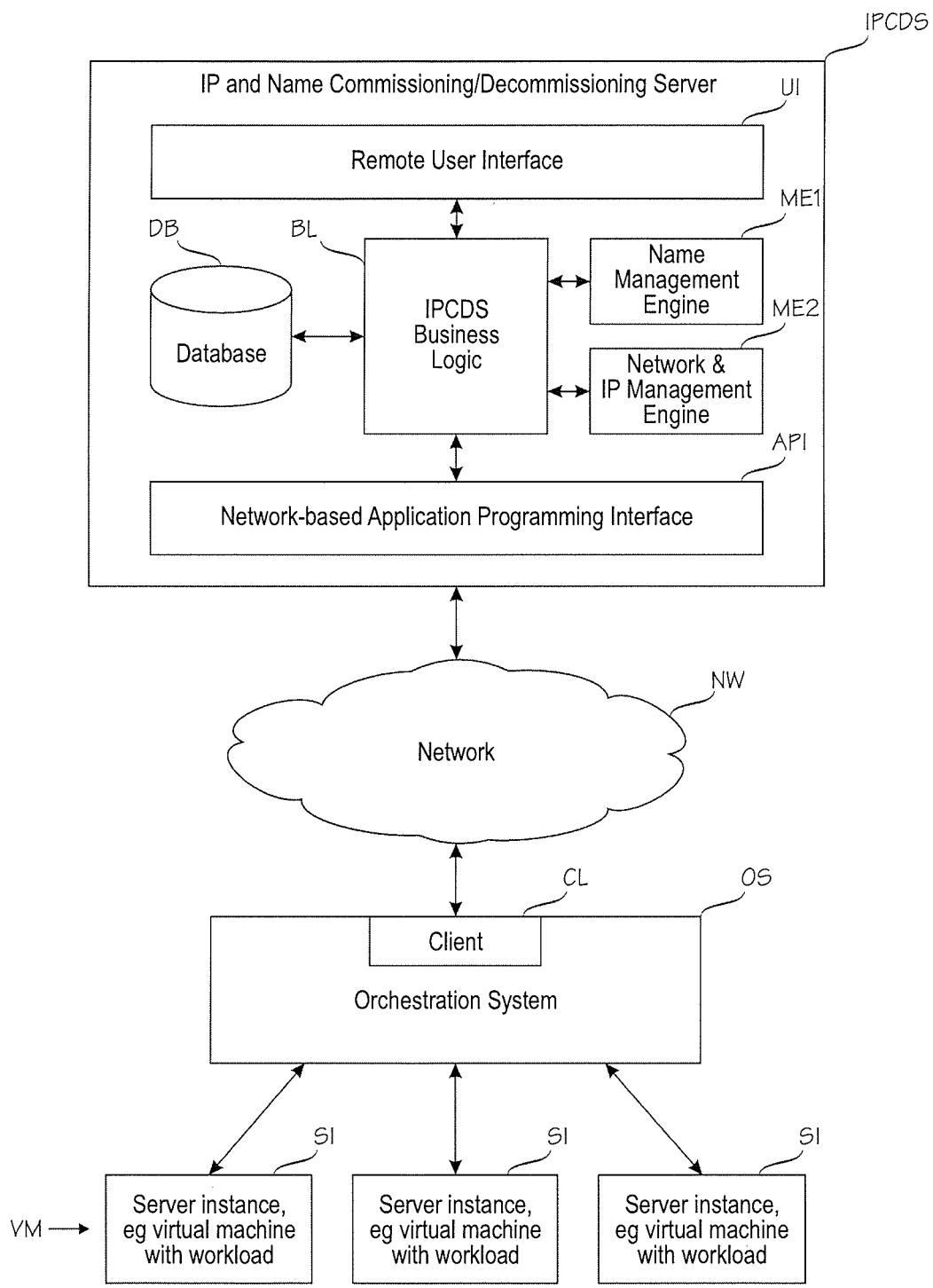
FIG. 1 is a block-level diagram of client-server architecture according to at least one disclosed embodiment.

Disclosed embodiments include a server equipment and client equipment which inter-operate according to principles of client-server architecture. In the present context, the inventive server is called an IP commissioning/decommissioning server apparatus ("IPCD server"). The IPCD server is used to manage and track, in real time, distribution and allocation of networks, the availability status of individual IP addresses within each network, related administrative properties and attributes. In a typical implementation, the IPCD server comprises the following elements:

- a remote user interface, such as a web-based user interface, which can be used to access the data managed in the IP commissioning/decommissioning server;
- a web-based Application Programming Interface (API) that supports Service Oriented Architecture (SOA) plus a logic capable of dynamically assigning and releasing IP resources, such as IP addresses, names, and other network configurations based on calls received via the API;
- another logic configured to associate individual networks with given internal and/or external end-users and, in the event that a network has been fully allocated, the IP commissioning/decommissioning server is configured to automatically provision an IP resource, (eg an IP address) from an alternate network associated with the internal and/or external end-user (client) and/or from a reserve pool of IP resources;
- a client-server architecture that involves a client run in the orchestration solution communicating with the IP commissioning/decommissioning server over the SOA-based API.

In a typical implementation, the IPCD client equipment comprises a client logic configured to perform the following tasks:

- requesting an IP resource, such as an IP address and/or a name, from the IP commissioning/decommissioning server when a new virtual machine is commissioned to the cloud computing environment using the orchestration solution; and
- triggering the release of the assigned IP resources, such as the IP address and/or the name of a virtual machine that has been decommissioned.

Disclosed embodiments also include methods for operating the inventive IPCD server and IPCD client, and computer program products whose execution in appropriately equipped server and client computers provide them with features of the IPCD server and IPCD client and thus cause the IPCD server and IPCD client to carry out the inventive method.

Unlike earlier attempts to couple DHCP with overlapping private networks, the present disclosure does not provision network parameters on OSI Layer 2 (L2). Instead the calls for requesting and assigning IP resources, communicated over the web-based API, operates on higher layers of the OSI model. This distinguishing feature helps to eliminate the restriction that IP resources must be managed within a single LAN. For instance, a technique for overcoming the single-LAN restriction is that the IPCD server stores information on private networks, it tags those private networks with the LANs, VLANs, Virtual eXtensible Local Networks (VX-LAN) and/or other similar LAN-related attributes used by them. In other words, the IPCD server stores information on which LAN(s) are used by which private network(s). Because overlapping address spaces cannot logically used the same VLANs, all managed network are made unique even if the networks per se use identical address spaces. When VLANs are connected to networks and used in provisioning, it is worth noting that address spaces can overlap but VLANs within a data center cannot.

According to at least one disclosed embodiment, if a service provider has multiple data centers, the IPCD server may also tags the network with information relating to the data center in which it is being run, in addition LAN-related attributes. This optional method is used to distinguish between overlapping private networks that are connected to identical LANs, VLANs and/or VXLANs in different data centers sharing the same IPCD service.

The above-identified elements will be described in more detail in the following. The disclosure involves, firstly, an IP commissioning/decommissioning server apparatus that is used to manage and track, in real time, distribution and allocation of networks, individual IP addresses within each network, related administrative properties and attributes. Unlike a conventional DHCP server which cannot reclaim an issued IP address before the expiry of the pre-configured fixed lease time, the IP commissioning/decommissioning server apparatus is configured to decommission and reclaim unused IP resources, such as IP addresses, as virtual machines are decommissioned. The decommissioning scheme of the IP commissioning/decommissioning server differs from known IP reconciliation models in the following respects. While some prior art IP reconciliation models permit reclaiming IP addresses that were allocated but are now unused, the prior art IP reconciliation models only permit reclamation of unused IP addresses only after their IP address lease time has expired. Otherwise there would be a risk of duplicate IP addresses, which will cause trouble.

Disclosed embodiments relate to situations wherein a virtual machine and/or a workload run in the cloud-based computing environment ceases to exist or is migrated to another cloud environment. This is quite common in clouding environments as virtual machines are commissioned and decommissioned on an on-demand basis. In such cases the client running in the orchestration system will notify the IP commissioning system when a workload is about to be decommissioned, or is migrated to another cloud environment. As a result of the notification, the inventive IP commissioning/decommissioning server will automatically release the resources, such as the IP address, formerly assigned to the client that no longer exists. No comparable mechanism exists in DHCP, since the DHCP specifications do not define a client able to notify the DHCP server about the fact that it will no longer use the IP address it has obtained and that the IP address can be released. Disclosed embodiments solve this problem by communicating with the orchestration system when the system is decommissioning or migrating workloads to another environment. Use of client-server architecture provides the benefit that the inventive IPCD server may obtain real-time information concerning whether or not a given IP resource is actually being used for anything. In the prior art, lack of accurate information on which IP resources are being used and which are merely assigned but not used makes it impossible to reclaim unused IP resources until the lease time has expired.

Disclosed embodiments relate to orchestrated computing environments that utilize SOA-based architectures, and in which the IP allocation should be carried out as part of the commissioning and/or decommissioning process managed by the orchestration system. Since SOA environments are based on open web-based APIs (e.g. SOAP) requiring systems to communicate with each other on the Application Layer (Layer 7 in the OSI model), a traditional DHCP server utilizes the Data Link Layer (Layer 2 in the OSI model) sent on OSI 2 layer, thereby making the two incompatible.

The present IP commissioning/decommissioning server further comprises a remote user interface, such as a web-based user interface, which can be used to access the data managed in the IP commissioning/decommissioning server. The remote user interface provides the ability to track allocation and usage levels of networks in real-time (with regard to stateless autoconfiguration). Other desirable features in the disclosed embodiments are the ability of administrators to transparently monitor these levels in real-time; to support multi-tenant environments, including the possibility to offer internal and/or external end-users a restricted access/viewing rights to the networks used by them; and the ability to manage networks (add, remove, split, merge and/or edit contents) and to be able to associate select attributes (e.g. VLAN associated with a given network; owner of the network; etc.) with the managed networks by tagging the select attributes or properties to them. The reason why the last part is important, is that in order to associate e.g. a given VLAN known by an orchestration solution with a network from which an IP is to be retrieved, there needs to be a common denominator, such as the VLAN tag or name, which is known to the orchestration system and the IP commissioning/decommissioning server alike. And to manage all this, a GUI is optional for many administrative users.

The present IP commissioning/decommissioning server further comprises an Application Programming Interface (API) that supports Service Oriented Architecture (SOA) plus a first logic capable of dynamically assigning and releasing IP resources, such as IP addresses and other network configurations based on calls received via the API.

The IP commissioning/decommissioning server further comprises a second logic configured to associate individual networks with given end-users and, in the event that a network has been fully allocated, the IP commissioning/decommissioning server is configured to automatically provision an IP resource, (e.g. an IP address) from an alternate network associated with the end-user and/or from a reserve pool of IP resources.

Yet further, the IP commissioning/decommissioning server comprises a client-server architecture that involves a client run in the orchestration solution communicating with the IP commissioning/decommissioning server over the SOA-based API.

As regards the client, the client comprises a client logic that requests an IP resource, such as an IP address and/or name, from the IP commissioning/decommissioning server when a new virtual machine is commissioned to the cloud-computing environment by the orchestration solution. The client logic triggers the release of the assigned IP resources, such as the IP address and/or the name of a virtual machine that has been decommissioned. FIG. 1 is a block-level diagram of a client-server architecture according to at least one disclosed embodiment. Reference sign IPCDS denotes the IP commissioning/decommissioning server (IPCD server) according to the present embodiment. Reference sign UI denotes a user interface, which may be a remote user interface, such as a web-based user interface. The user interface can be used to access the data managed in the IPCD server IPCDS. Reference sign API denotes an Application Programming Interface that supports Service Oriented Architecture (SOA). Reference sign BL denotes a business logic, which is capable of dynamically assigning and releasing IP resources, such as IP addresses, names, and other network configurations based on calls received via the API. The present embodiment of the IPCD server IPCDS further comprises two management engines ME1 and ME2, which respectively correspond to the first logic and second logic, and which are collectively configured to associate individual networks with given end-users and, in the event that a network has been fully allocated, the IP commissioning/decommissioning server is configured to automatically provision an IP resource, (e.g. an IP address) from an alternate network associated with the internal and/or external end-user and/or from a reserve pool of IP resources.

Reference sign CL denotes a client computer of the inventive client-server architecture. The client computer CL runs in, or in connection with, an orchestration solution OS communicating with the IPCD server IPCDS over the SOA-based Application Programming Interface API. The orchestration solution OS supports a number of server instances SI. In a typical implementation the server instances SI are virtual machines, each of which has a respective workload.

Figure 2B:
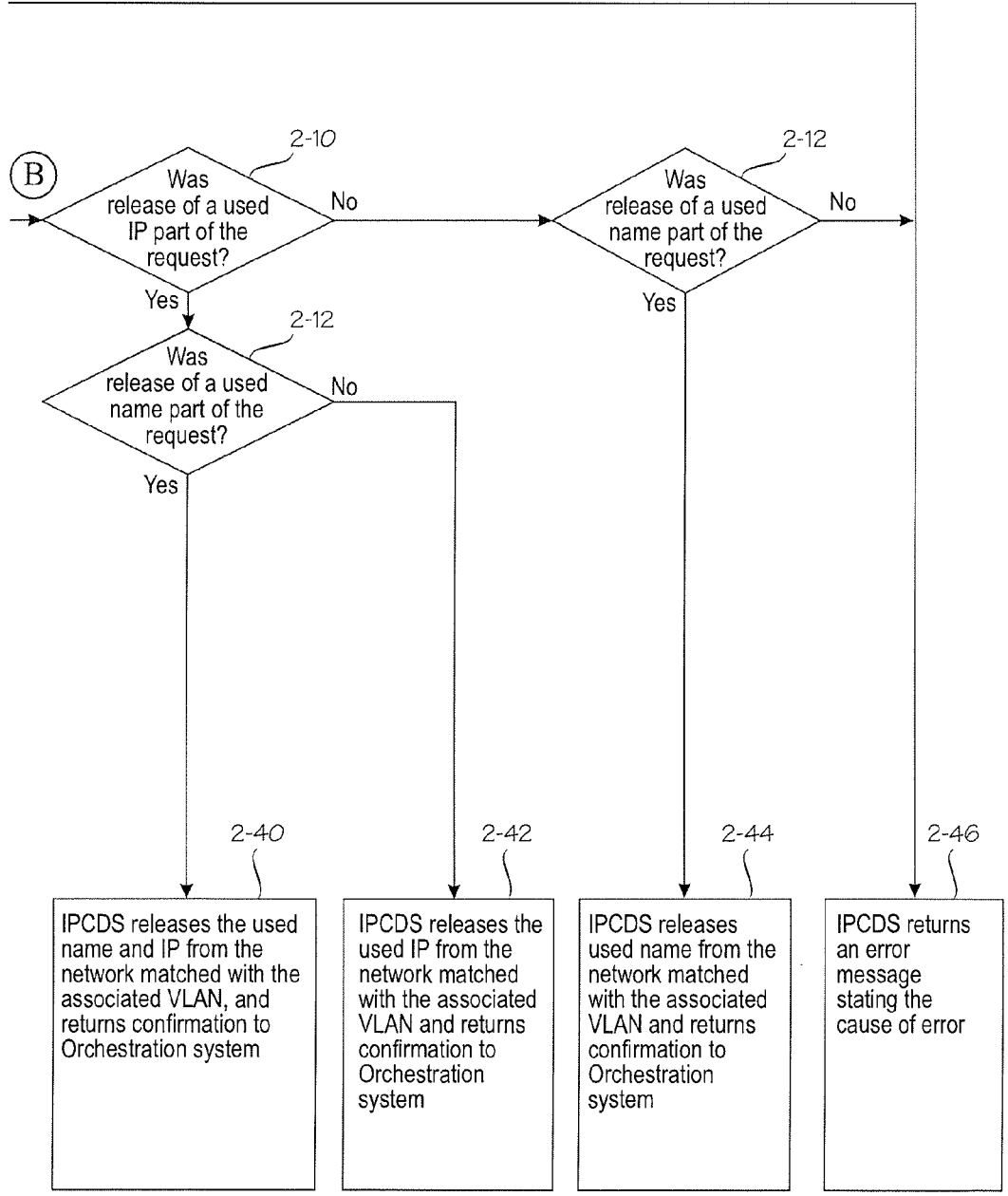
FIG. 2, which consists of partial drawings 2A and 2B, is a flow chart illustrating operation of an IP commissioning/decommissioning server (IPCD server) according to at least one disclosed embodiment.

FIG. 2, which consists of partial drawings 2A and 2B, is a flow chart illustrating operation of an IP commissioning/decommissioning server (IPCD server) according to at least one disclosed embodiment.

In step 2-2 the orchestration system sends a request to the IPCD server IPCDS, wherein the request identifies the virtual local-area network VLAN in which a host is to be deployed. In step 2-4 the IPCD server IPCDS examines whether the VLAN is tagged to a network managed by the present IPCD system. If not, the flow proceeds to step 2-46 (see drawing 2B), wherein the IPCD server IPCDS returns an error message stating the cause of the error. If in step 2-4 the outcome is positive, the flow proceeds to step 2-6, wherein the IPCD server IPCDS examines whether issuance of an IP address was part of the request. If yes, the flow proceeds to step 2-14, wherein the IPCD server IPCDS examines if a free IP address is available in the first network associated with the VLAN. If yes, the flow proceeds to step 2-20, wherein the IPCD server IPCDS examines if issuance of a name was part of the request. If it was, the flow proceeds to step 2-30, wherein the IPCD server IPCDS reserves a free IP address and generates a unique name attaching it to a default zone configured to the network associated with the VLAN. The IPCD server IPCDS then returns the unique name and IP address to the orchestration system OS and marks the IP address as used in the network from which it was allocated. If the outcome of step 2-20 was negative, the flow proceeds to step 2-32, wherein the IPCD server IPCDS reserves a free IP address, returns it to the orchestration system OS, and marks the IP address as used in the network from which it was allocated.

If the outcome of step 2-6 was negative, the flow proceeds to step 2-8, wherein the IPCD server IPCDS examines whether issuance of a name was part of the request. If yes, the flow proceeds to step 2-38, wherein the IPCD server IPCDS returns an automatically generated name attaching it to a default zone configured to the network associated with the VLAN, and returns the unique name to the orchestration system OS. If the outcome of step 2-8 was negative, the flow proceeds to step 2-10, wherein the IPCD server IPCDS examines whether release of an IP address was part of the request. If yes, the flow proceeds to step 2-18, wherein the IPCD server IPCDS examines whether release of a used name was part of the request. If yes, the flow proceeds to step 2-40, wherein the IPCD server IPCDS releases the used name and IP address from the network that matched the associated VLAN, and returns a confirmation to the orchestration system OS. If the outcome of step 2-18 was negative, the flow proceeds to step 2-42, wherein the IPCD server IPCDS releases the used IP from the network matched with the associated VLAN and returns a confirmation to the orchestration system OS.

In the present example, if the outcome of step 2-10 was negative, the flow proceeds to step 2-12, wherein the IPCD server IPCDS notices that the request did not relate to any of the functions of the IPCD server, and returns an error message. In more ambitious implementations with more functions, the branch from step 2-12 to the right may proceed to further tests and functions.

If the outcome of step 2-14 was negative, the flow proceeds to step 2-16, wherein the IPCD server IPCDS examines if there are other networks tagged with the same VLAN. If there are, the flow proceeds to step 2-22, wherein the IPCD server IPCDS examines if there are free IP addresses in the other networks. If there are, the IPCD server IPCDS examines in step 2-24 if issuance of a name was part of the request. If yes, the flow proceeds to the above-described step 2-30. If not, the flow proceeds to step 2-34, wherein the IPCD server IPCDS returns the free IP address to the orchestration system OS and marks it as used in the network from which the IP was allocated.

If the outcome of step 2-16 or 2-22 is negative, the flow proceeds to step 2-36, wherein the IPCD server IPCDS returns an automatically generated name attaching it to a default zone configured to the network associated with the VLAN, and returns the unique name to the orchestration system OS.

FIG. 3 schematically shows an exemplary block diagram for the various information processing elements. The data processing architecture shown in FIG. 3, generally denoted by reference numeral 3-100, can be used to implement the servers and clients. A configuration appropriate for a server is shown; the configuration of a client computer may be simpler. The two major functional blocks are a processing system 3-100 and a storage system 3-190. The processing system 3-100 comprises one or more central processing units CP1 . . . CPn, generally denoted by reference numeral 3-110. The processing units may be native or virtual processing units. Disclosed embodiments comprising multiple processing units 3-110 may be provided with a load balancing unit 3-115 that balances processing load among the multiple processing units 3-110. The multiple processing units 3-110 may be implemented as separate processor components or as physical processor cores or virtual processors within a single component case. The processing system 3-100 further comprises a network interface 3-120 for communicating with various data networks, which are generally denoted by reference sign DN. The data networks DN may include local-area networks, such as an Ethernet network, and/or wide-area networks, such as the internet. Reference numeral 3-125 denotes a mobile network interface, through which the processing system 3-100 may communicate with various access networks AN, which in turn serve the mobile terminals used by end users or clients. A configuration supporting multiple different networks enables the processing system 3-100 to support multiple types of clients, such as land-based terminals 3-200 and mobile terminals 3-210.

The processing system 3-100 of the present embodiment may also comprise a local user interface 3-140. Depending on implementation, the user interface 3-140 may comprise local input-output circuitry for a local user interface, such as a keyboard, mouse and display (not shown). Alternatively or additionally, management of the processing system 3-100 may be implemented remotely, by utilizing the network interface 3-120 and any internet-enabled terminal that provides a user interface. The nature of the user interface depends on which kind of computer is used to implement the processing system 3-100. If the processing system 3-100 is a dedicated computer, it may not need a local user interface, and the processing system 3-100 may be managed remotely, such as from a web browser over the internet, for example. Such remote management may be accomplished via the same network interface 3-120 that the computer utilizes for traffic between itself and the client terminals.

The processing system 3-100 also comprises memory 3-150 for storing program instructions, operating parameters and variables. Reference numeral 3-160 denotes a program suite for the processing system 3-100.

The processing system 3-100 also comprises circuitry for various clocks, interrupts and the like, and these are generally depicted by reference numeral 3-130. The processing system 3-100 further comprises a storage interface 3-145 to the storage system 3-190. When the processing system 3-100 is switched off, the storage system 3-190 may store the software that implements the processing functions, and on power-up, the software is read into semiconductor memory 3-150. The storage system 3-190 also retains operating and variables over power-off periods. In large-volume implementations, that is, implementations wherein a single processing system 3-100 serves a large number of clients via respective mobile terminals MT, the storage system 3-190 may be used to store the dynamic dialog matrices associated with the clients and mobile terminals MT. The various elements 3-110 through 3-150 intercommunicate via a bus 3-105, which carries address signals, data signals and control signals, as is well known to those skilled in the art.

It will be apparent to a person skilled in the art that, as the technology advances, the inventive concept can be implemented in various ways. The disclosed embodiments are not limited to the examples described above but may vary within the scope of the claims.

The invention claimed is:

1. A server computer comprising:
   a processing system comprising at least one processing unit storing applications and data,
   wherein the server computer commissions/decommissions Internet Protocol ["IP"] resources to a plurality of hosts provisioned using one or more orchestration solutions,
   wherein the server computer and the one or more orchestration solutions constitute a client-server architecture,
   wherein the processing system comprises program code instructions instructing the processing system to implement the following features:
      a user interface for remote management of the server computer, wherein the user interface provides access to data managed by the server computer;
      a web-based application programming interface that supports service oriented architecture ["SOA"]; and
      a first logic that dynamically assigns and releases IP resources to a plurality of hosts via the one or more orchestration solutions and the web-based application programming interface,
      wherein the first logic comprises program code instructions for creating at least one unique IP resource for each of two or more hosts, wherein the two or more hosts are nodes of networks with overlapping address spaces, and
      wherein the at least one unique IP resource is based on a combination of a name of a private network of a respective one of the two or more hosts, and an IP address within that private network.

2. The server computer of claim 1, further comprising a second logic associating individual networks with given end-users wherein, in case one or more resources of a network have been fully allocated, the second logic automatically provisions an IP resource from an alternate network, which is associated with the end-user, and/or from a reserve pool of IP resources.

3. A method for operating a server computer, the method comprising:
   using the server computer to commission/decommission Internet Protocol ["IP"] resources to a plurality of hosts provisioned using one or more orchestration solutions, wherein the server computer and the one or more orchestration solutions constitute a client-server architecture;
   providing the server computer with a web-based application programming interface ["API"] capable of supporting service oriented architecture ["SOA"];
   configuring a remote user interface to provide access to data managed by the server computer;
   remotely managing the server computer via the remote user interface;
   dynamically assigning and releasing IP resources to a plurality of hosts via the one or more orchestration solutions and the web-based application programming interface; and
   creating at least one unique IP resource for each of two or more hosts, wherein the two or more hosts are nodes of networks with overlapping address spaces,
   wherein the at least one unique IP resource is based on a combination of a name of a private network of a respective one of the two or more hosts, and an IP address within that private network.

4. A non-transitory computer program product comprising:
   stored program code instructions for a server computer, wherein the program code instructions, when executed on a server computer, cause the server computer to execute the following acts:
   commissioning/decommissioning Internet Protocol ["IP"] resources to a plurality of hosts provisioned using one or more orchestration solutions, wherein the server computer and the one or more orchestration solutions constitute a client-server architecture;
   providing a user interface for remote management of the server computer, wherein the user interface provides access to data managed by the server computer;
   providing a web-based application programming interface that supports service oriented architecture ["SOA"]; and
   based on a first logic, dynamically assigning and releasing IP resources to a plurality of hosts via the one or more orchestration solutions and the web-based application programming interface,
   wherein the first logic comprises program code instructions for creating at least one unique IP resource for each of two or more hosts, wherein the two or more hosts are nodes of networks with overlapping address spaces, and wherein the at least one unique IP resource is based on a combination of a name of a private network of the respective one of the two or more hosts and an IP address within that private network.

* * * * *